(12) United States Patent
Mesa et al.

(10) Patent No.: US 10,530,966 B2
(45) Date of Patent: Jan. 7, 2020

(54) PRINTER FIRMWARE ENCRYPTION

(71) Applicant: Hewlett-Packard Development Company, L.P., Houston, TX (US)

(72) Inventors: Honee L Mesa, Eagle, ID (US); Marvin D Nelson, Meridian, ID (US); Paul Jeran, Boise, ID (US); Chris R Gunning, Boise, ID (US); Erik D Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/073,033

(22) PCT Filed: May 27, 2016

(86) PCT No.: PCT/US2016/034637
§ 371 (c)(1),
(2) Date: Jul. 26, 2018

(87) PCT Pub. No.: WO2017/204823
PCT Pub. Date: Nov. 30, 2017

(65) Prior Publication Data
US 2019/0037107 A1 Jan. 31, 2019

(51) Int. Cl.
| | | |
|---|---|---|
| *H04N 1/44* | (2006.01) | |
| *G06F 21/44* | (2013.01) | |
| *G06F 21/60* | (2013.01) | |
| *G06F 21/76* | (2013.01) | |
| *H04L 9/08* | (2006.01) | |
| *H04N 1/00* | (2006.01) | |

(52) U.S. Cl.
CPC .......... *H04N 1/4426* (2013.01); *G06F 21/44* (2013.01); *G06F 21/608* (2013.01); *G06F 21/76* (2013.01); *H04L 9/0897* (2013.01); *H04N 1/0097* (2013.01); *H04N 1/4433* (2013.01)

(58) Field of Classification Search
CPC ...................................................... H04N 1/4426
USPC ......................................................... 358/1.15
See application file for complete search history.

(56) References Cited

U.S. PATENT DOCUMENTS

| | | | |
|---|---|---|---|
| 7,293,292 B2 | 11/2007 | Testardi et al. | |
| 7,613,932 B2 | 11/2009 | Nance et al. | |
| 7,730,306 B2 | 6/2010 | Fujino | |
| 8,973,103 B2 | 3/2015 | Jin | |

(Continued)

FOREIGN PATENT DOCUMENTS

EP        1973052 A1    9/2008

OTHER PUBLICATIONS

Wasicek, A., et al., "Authentication in Time-triggered Systems Using Time-delayed Release of Keys", (ISORC), 14th IEEE International Symposium, Mar. 2011, 31-39.

*Primary Examiner* — Jacky X Zheng
(74) *Attorney, Agent, or Firm* — HP Inc. Patent Department

(57) ABSTRACT

Examples associated with printer firmware encryption are described. One example printer includes a base firmware module. The base firmware module controls a base function of the printer. The printer also includes a first encrypted firmware module that modifies a first function of the printer. The first encrypted module is inactive until decrypted. A firmware decryption module decrypts the first encrypted module upon receiving a first encryption key.

14 Claims, 6 Drawing Sheets

(56) References Cited

U.S. PATENT DOCUMENTS

| | | | |
|---|---|---|---|
| 2006/0087678 A1* | 4/2006 | Simpson | G06F 21/34 358/1.15 |
| 2007/0088613 A1 | 4/2007 | Adkins et al. | |
| 2007/0097410 A1 | 5/2007 | Norimoto | |
| 2007/0288423 A1 | 12/2007 | Kimoto | |
| 2013/0083096 A1* | 4/2013 | Rice | G06F 21/44 347/2 |
| 2013/0215474 A1 | 8/2013 | Caton et al. | |
| 2014/0169803 A1* | 6/2014 | Lee | G03G 15/0863 399/12 |
| 2014/0270813 A1* | 9/2014 | Ignatchenko | B41J 2/17546 399/12 |
| 2015/0086014 A1 | 3/2015 | Adkins et al. | |

* cited by examiner

PRINTER FIRMWARE ENCRYPTION

CROSS REFERENCE TO RELATED APPLICATIONS

The subject matter of this application is related to that of copending patent application Ser. No. PCT/US16/34631 filed concurrently herewith by M. Nelson et al. for FIRMWARE MODULE ENCRYPTION and assigned to a common assignee. The disclosure of application Ser. No. PCT/US16/34631 is incorporated herein by reference.

The matter of this application is related to that of copending patent application Ser. No. PCT/US16/34642 filed concurrently herewith by M. Nelson et al. for PRINTER AUTHENTICATION and assigned to a common assignee. The disclosure of application Ser. No. PCT/US16/34642 is incorporated herein by reference.

BACKGROUND

A device firmware is a set of instructions embedded in the device that facilitate controlling, monitoring, and so forth, the device and/or or components of the device. In various examples, the device firmware may be held in a non-volatile memory and may rarely, if ever, be changed during the life cycle of the device (depending on the type of device). In a printer, firmware may control, for example, how the printer performs functions relating to printing, scanning, copying, dialing fax numbers, emailing, performing device maintenance, connecting to other devices, communicating information to and receiving information from users, and so forth. Printer firmware may also control how the printer interacts with print containers inserted into the printer.

BRIEF DESCRIPTION OF THE DRAWINGS

The present application may be more fully appreciated in connection with the following detailed description taken in conjunction with the accompanying drawings.

DETAILED DESCRIPTION

Printers, methods, and equivalents associated with printer firmware encryption are described. As described above, printers may include firmware that controls a variety of printer functions. These functions may relate to how the printer prints, scans, communicates with external devices, and so forth depending on the features the printer was designed to perform. Updating firmware of a printer may be challenging after releasing the printer because, for example, the firmware may be stored on a non-volatile memory embedded in the printer, updating the firmware require physical and/or network access to the printer, and so forth. This may increase effort needed to activate a previously hidden or otherwise inactive capability of the printer that relies on a change in the firmware of the printer.

Consequently, portions of printer firmware may be encrypted to allow for their delayed activation. Though some printers may employ firmware encryption to deter malicious attacks against printers, firmware encryption described herein facilitates delayed and/or separate activation of firmware modules that modify and/or add to how the default portions of firmware operate. To decrypt encrypted portions of firmware, a firmware decryption module may receive decryption keys corresponding to respective encrypted portions of firmware to allow decryption and activation of these portions.

In some examples, encrypted modules may be used to hinder usage of unauthorized print containers by the printer. When printers are released, firmware of the printers may include a series of encrypted modules that update authentication techniques used to determine whether containers of print material inserted in the printer are counterfeit or otherwise unauthorized. Over time, the decryption module may receive decryption keys to allow activation of these encrypted modules, and print containers that respond to these new authentication techniques may also be sold.

Figure 1:
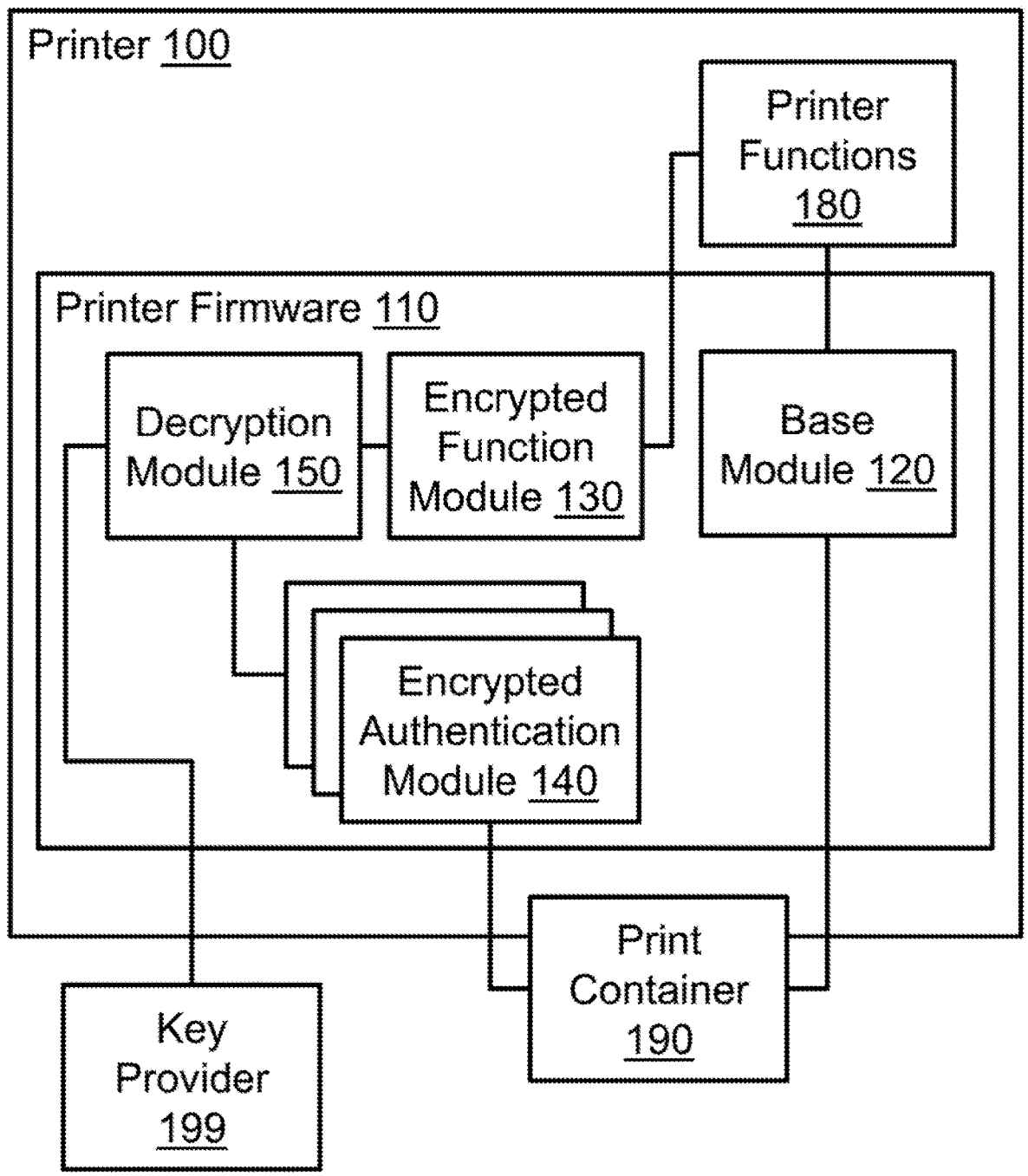
FIG. 1 illustrates an example printer associated with printer firmware encryption.

FIG. 1 illustrates an example printer 100 associated with printer firmware encryption. It should be appreciated that the items depicted in FIG. 1 are illustrative examples, and many different systems, devices, and so forth, may operate in accordance with various examples.

FIG. 1 illustrates an example printer 100 associated with printer firmware encryption. Printer 100 may be a variety of types of printers including a desktop printer, a shared office printer, an industrial printer, a 3D printer, and so forth. Printer 100 may have a variety of printer functions 180 depending on its model, design, and so forth including, for example, printing, scanning, copying, corrugating, cutting, drying, modeling, communicating with other devices (e.g., computers, other printers, printer peripherals, communicating with users, and so forth.

Printer 100 includes printer firmware 110. Printer firmware 110 may be stored on a memory embedded in printer 100 during manufacture of printer 100. In other examples, printer firmware may be updated after manufacture of printer 100 by an automatic process, by a user, and so forth. Printer firmware 100 may control a variety of printer functions 180 performed by printer 100. Specifically, printer firmware 110 may include a base module(s) 120 that control printer functions 180. Depending on the sophistication of printer 100, base module 120 may effectively operate as an interface between applications and/or users that seek to control printer functions 180 to perform a task. These applications may reside within printer 100, operate on external devices (not shown), and so forth.

Printer firmware 110 also includes several encrypted modules. Encrypted modules may be deactivated until decrypted by a decryption module 150. To decrypt an encrypted module, decryption module 150 may use a decryption key received from a key provider 199. The decryption key may allow decryption module 150 to decrypt a corresponding encrypted module allowing the encrypted module to execute. In this example, key provider 199 is illustrated as being external to printer 100. Examples of external key providers 199 include, for example, users, other printers, a computer connected to printer 100, a remote server, and so forth. In other examples, key provider 199 may be built into printer 100 and designed to deliver decryption keys to decryption module 150 in specific circumstances. An example of an internal key provider 199 is a secure application specific integrated circuit that is designed to deliver decryption keys to decryption module 150 on a set schedule. The set schedule may be based, for example, on specific calendar dates, dates relative to an event (e.g., initial activation) associated with printer 100, usage of printer 100, usage of consumables by printer 100, maintenance events for printer 100, and so forth. In other examples, decryption keys may be provided to decryption module 150 as a reward, to activate a printer function 180, after receiving a payment, on a temporary basis, and so forth.

In some examples, the encrypted modules may be encrypted function modules 130. Encrypted function modules 130 may affect how printer firmware 110 controls or performs a printer function 180. Consequently, upon decryption by decryption module 150, encrypted function module 130 may modify, replace, deactivate, and module 120 or a portion thereof. In other examples, encrypted function module 130 may activate a previously inactive printer function 180. This may be used to, for example, incentivize purchase of a special functionality of printer 100. In other examples, activating a previously inactive printer function 180 may be desirable when a new component is attached to printer 100, to activate a function that was not ready at a time of manufacture of printer 100, and so forth.

In other examples, encrypted modules may be encrypted authentication modules 140. Encrypted authentication modules 140 may be used to authenticate print containers 190 or other components attached to printer 100 as authentic components. This may be desirable to, for example, hinder distribution of counterfeit or otherwise unauthorized print components.

In FIG. 1, a print container 190 is illustrated as being attached to printer 100. Prior to decryption of an encrypted authentication module 140, a base module 120 may govern authentication of print container 190 to deter use of counterfeit and/or otherwise unauthorized print containers by printer 100. Over the course of the life cycle of printer 100, key provider 199 may provide a series of decryption keys for encrypted authentication modules 140. As encrypted authentication modules 140 are decrypted, the encrypted authentication modules may replace one another and/or a portion of base module 120. This may allow techniques used to authenticate print containers 190 to change over the life cycle of the printer.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to instructions stored on a computer-readable medium or in execution on a machine that perform a function(s) or an action(s), and/or to cause a function or action from another module, method, and/or system. Where multiple logical modules are described, it may be possible to incorporate the multiple logical modules into one logical module. Similarly, where a single logical module is described, it may be possible to distribute that single logical module between multiple logical modules.

Figure 2:
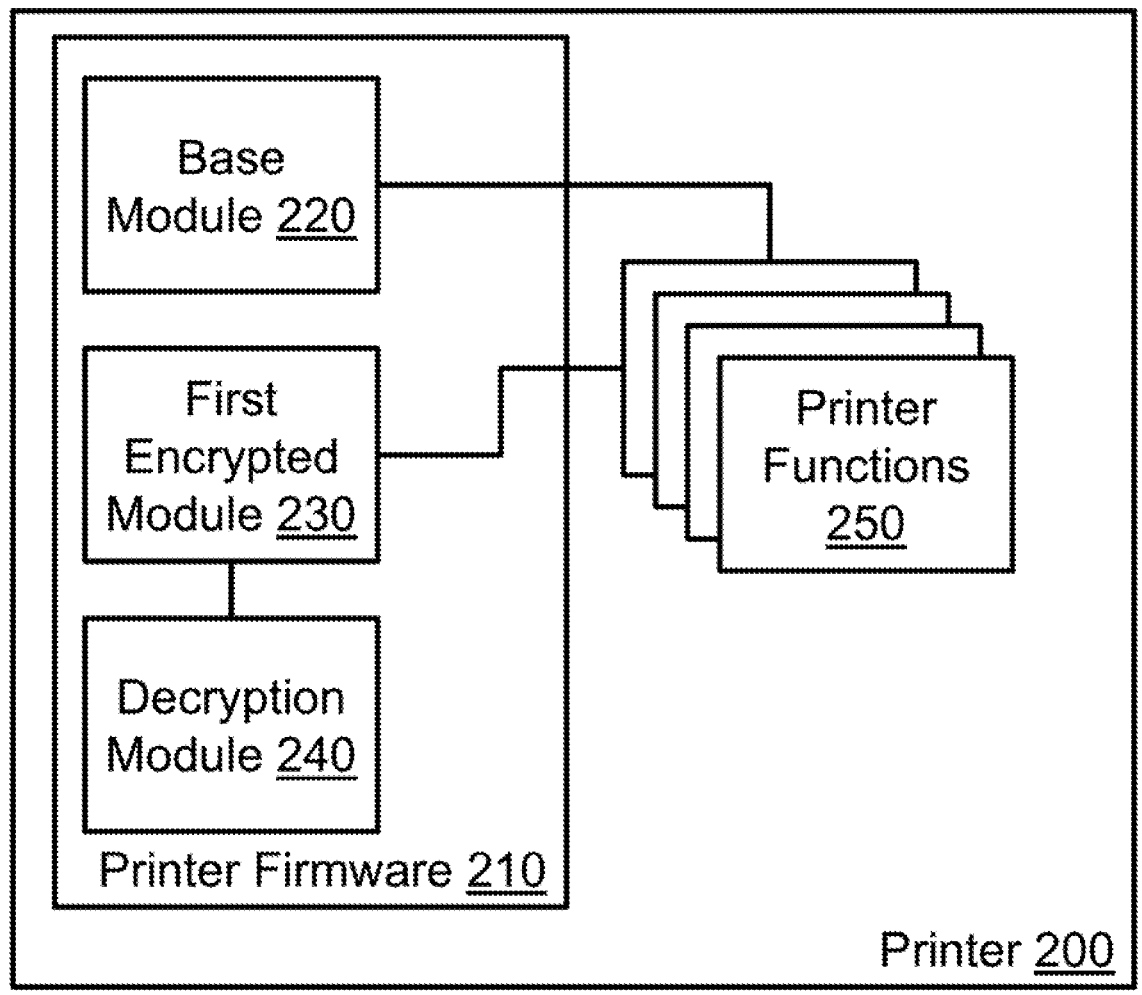
FIG. 2 illustrates another example printer associated with printer firmware encryption.

FIG. 2 illustrates an example printer 200 associated with printer firmware encryption. Printer 200 includes a printer firmware 210. Printer firmware 210 includes a base module 220. Base module 220 may control a base function of printer 200. The base function of printer 200 may be one of numerous functions 250 of printer 200. The base function, as well as other functions 250 of printer 200 may be performed by hardware, software, firmware, other components, and/or a combination of components of printer 200. Printer functions 250 may relate to, for example, printing, scanning, copying, cleaning print heads, other maintenance tasks, managing components of the printer, managing supplies and/or containers of supplies consumed by the printer, communicating with external devices (e.g., personal computers), and so forth.

Printer firmware 210 also includes a first encrypted module 230. The first encrypted module may be inactive until decrypted. The first encrypted module may modify a first function of printer 200. As with the base function controlled by base module 220, the first function may be one of numerous printer functions 250 performed by printer 200. In various examples, the first function may relate to, a reward function associated with the printer, a security function associated with the printer, a schedule on which other encrypted firmware modules are released, compensating for aging of a component of the printer, counterfeit deterrence by the printer, and so forth.

Modifying the first function may include, for example, activating the first function, replacing executable instructions associated with the first function, changing a way the first function is performed, changing a component of printer 200 performing the first function, deactivating the first function, and so forth. When activating a printer function 250, first encrypted module 220 may provide executable instructions to device 200 that cause printer 200 to perform the first function. In various examples, decryption of first encrypted module 220 and modifications to the first function, including activation of the first function, may occur during operation of printer 200. Thus, in some circumstances updating printer firmware 210 by decrypting and activating first encrypted module 220 may be possible without powering down printer 200 or otherwise restarting printer 200 which may allow uninterrupted use of printer 200 during the firmware updates.

In some examples, the base function and the first function may be the same function. Thus, first encrypted module 230 may modify the base function by, for example prevent further operation of base module 220, thereby causing first encrypted module 230 to replace base module 220 during operation of printer 200. In other examples, first encrypted module 230 may modify the way base module 220 performs the base function, and so forth.

To illustrate, the base firmware module and the first encrypted firmware module may control how the printer authenticates authorized containers of print material inserted into the printer. An authorized container of print material may be, for example, a print container that has been designed and manufactured for the printer and is not a counterfeit print container. A manufacturer of printer 200 may designate certain print containers as authorized containers of print material for use by printer 200. This may allow the manufacturer to, for example, maintain certain quality assurances associated with the printer, reduce maintenance costs of the printer, and so forth. Other print containers may be considered unauthorized containers and the manufacturer may desire to inhibit their use by printer 200, and authenticating containers of print material may facilitate achieving this goal. When first encrypted module 230 is decrypted by decryption module 240, first encrypted module 230 may modify how printer 200 authenticates containers of print material. This may make it more difficult for producers of unauthorized print containers to continue to produce unauthorized containers without also updating the authentication technique used by their print containers. On the other hand, knowing about the impending decryption of first encrypted module 230, may begin distributing authorized print containers that properly authenticate themselves to the new module.

Printer firmware 210 also includes a first decryption module 240. First decryption module 240 may decrypt the first encrypted module using a first encryption key. The encryption key may be received from, for example, another component of printer 200, an external device via a network connection, an external device over a direct connection, a user input, and so forth. In some examples, the encryption key may be obtained from multiple sources and assembled by decryption module 240.

Figure 3:
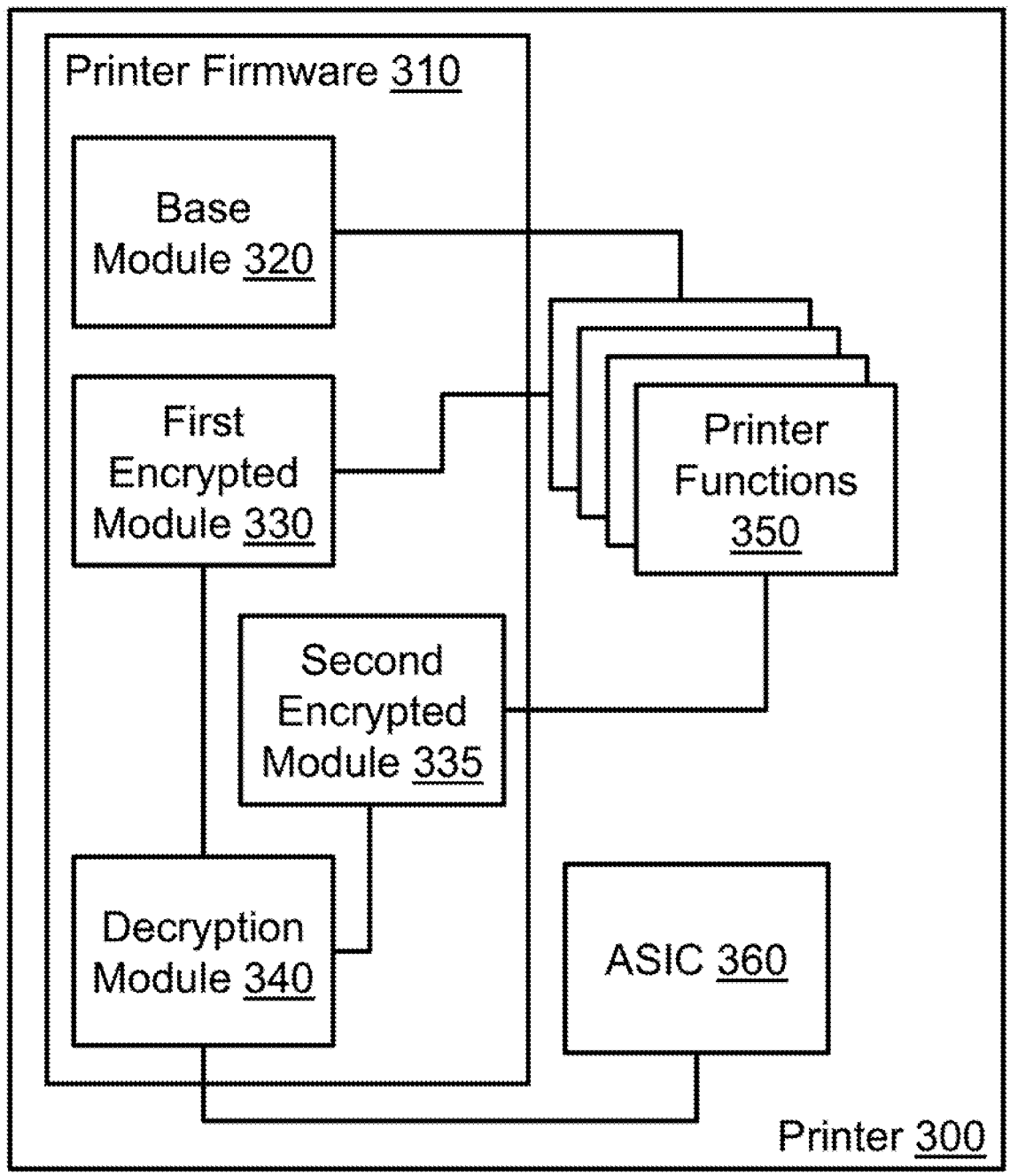
FIG. 3 illustrates another example printer associated with printer firmware encryption.

FIG. 3 illustrates a printer 300 associated with firmware encryption. Printer 300 includes several items similar to those described above with reference to printer 200 (FIG. 2). For example, printer 300 includes a printer firmware 310 containing a base module 320, a first encrypted module 330, and a decryption module 340. The base module and the first encrypted module 330 may affect operation of a set of printer functions 350.

Printer firmware 310 also includes a second encrypted module 335. Second encrypted module 335 may modify a second function of printer 300. In some examples, the second function of printer 300 may be one of the printer functions 350 performed by printer 300, and may be the same function as a base function controlled by base module 320 and/or a first function affected by first encrypted module 330. Second encrypted module 335 may be inactive until decrypted by decryption module 340. Decryption module 340 may use a second encryption key to decrypt second encrypted module 335.

Printer 300 also includes an application specific integrated circuit (ASIC) 360. ASIC 360 may securely store encryption keys including a first encryption key used to decrypt first encrypted module 330 and the second encryption key. The encryption keys stored in ASIC 360 may be periodically provided by ASIC 360 to decryption module 340 causing decryption module 340 to decrypt corresponding encryption modules of device firmware 310. The encryption keys may be provided at predetermined occasions based on, for example, a date, usage of the printer, a maintenance event of the printer, and so forth. By way of illustration, ASIC 360 may include a secure clock that is configured to cause release of encryption keys at specific dates. These dates may correspond to a schedule of print container releases known in advance of the production of the printer.

Figure 4:
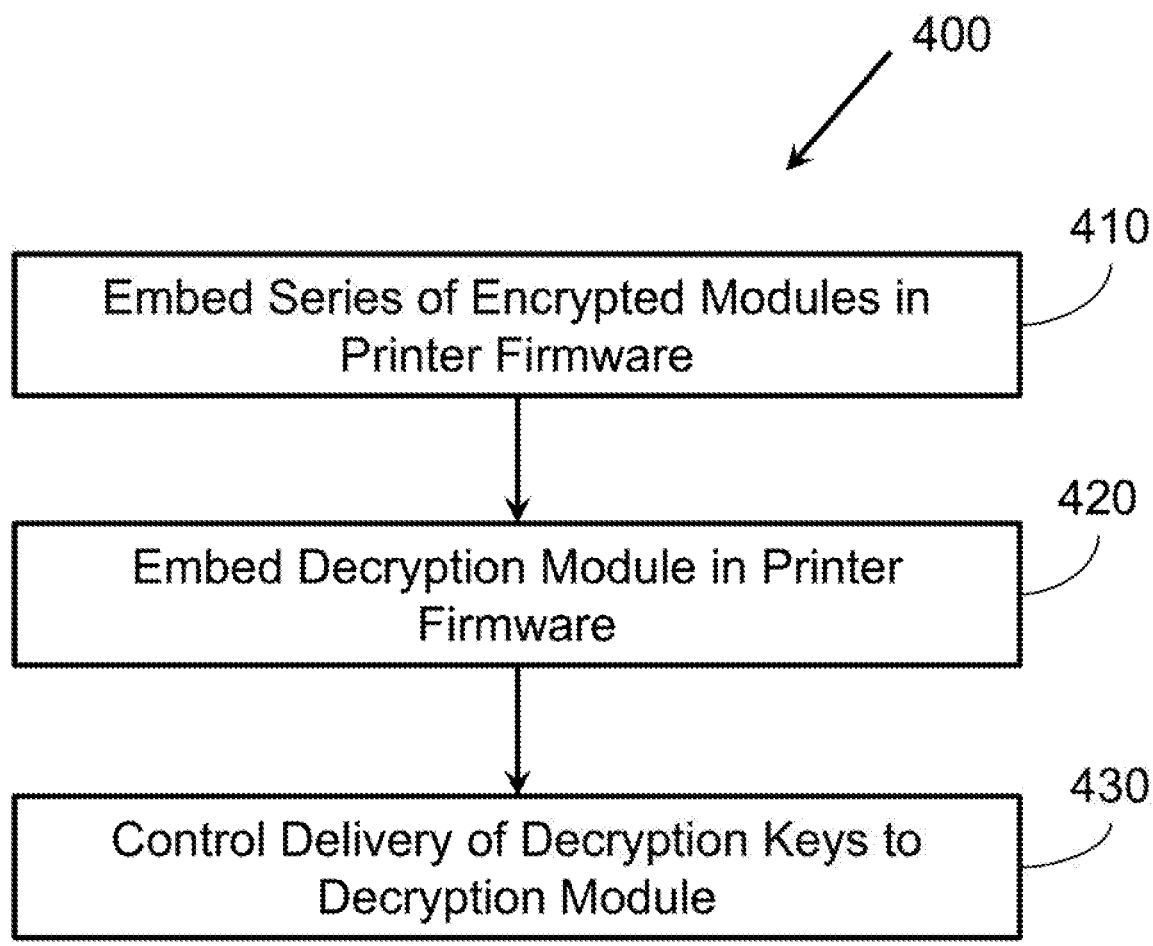
FIG. 4 illustrates a flowchart of example operations associated with printer firmware encryption.

FIG. 4 illustrates a method 400 associated with printer firmware encryption. Method 400 may be embodied on a non-transitory processor-readable medium storing processor-executable instructions. The instructions, when executed by a processor, may cause the processor to perform method 400.

Method 400 includes embedding a series of encrypted modules in the firmware of a printer at 410. The series of encrypted modules may be scheduled to be decrypted on a set schedule. The set schedule may be, for example, a temporal schedule, a usage based schedule, a maintenance schedule, and so forth. The encrypted modules may affect how the printer authenticates as authentic containers of print material that are released over the life cycle of the printer.

Method 400 also includes embedding a decryption module in the firmware of the printer at 420. The decryption module may receive decryption keys associated with encryption modules. The decryption module may use the decryption keys to decrypt corresponding encrypted modules. The decryption module may also control execution of the decrypted modules. In some examples, upon decryption of a member of the series of encrypted modules, a previous member of the series of encrypted modules may be deactivated. In other examples, decrypted modules may remain functional over the remaining life cycle of the device.

Method 400 also includes controlling delivery of the decryption keys to the decryption module at 430. In some examples, controlling delivery of the decryption keys may be achieved by embedding a secure delivery vector into the device. Consequently, the secure delivery vector may provide the decryption keys to the decryption module in association with the set schedule. The secure delivery vector may be an application specific integrated circuit.

In some examples, the series of encrypted modules may be embedded into the firmware of a set of printers. This may mean the series of encrypted modules is embedded into the firmware of each member of the set of printers. In these examples, decryption keys associated with the encrypted modules may vary between members of the set of printers. Using differing decryption keys from printer to printer may make it more difficult to decrypt and analyze the encrypted modules. To further hinder undesirable decryption of the encrypted modules, the encrypted modules may be programmatically generated from a set of base modules. This may allow encrypted modules generated from the same base module to take differing actions that control the printers to achieve similar results.

Figure 5:
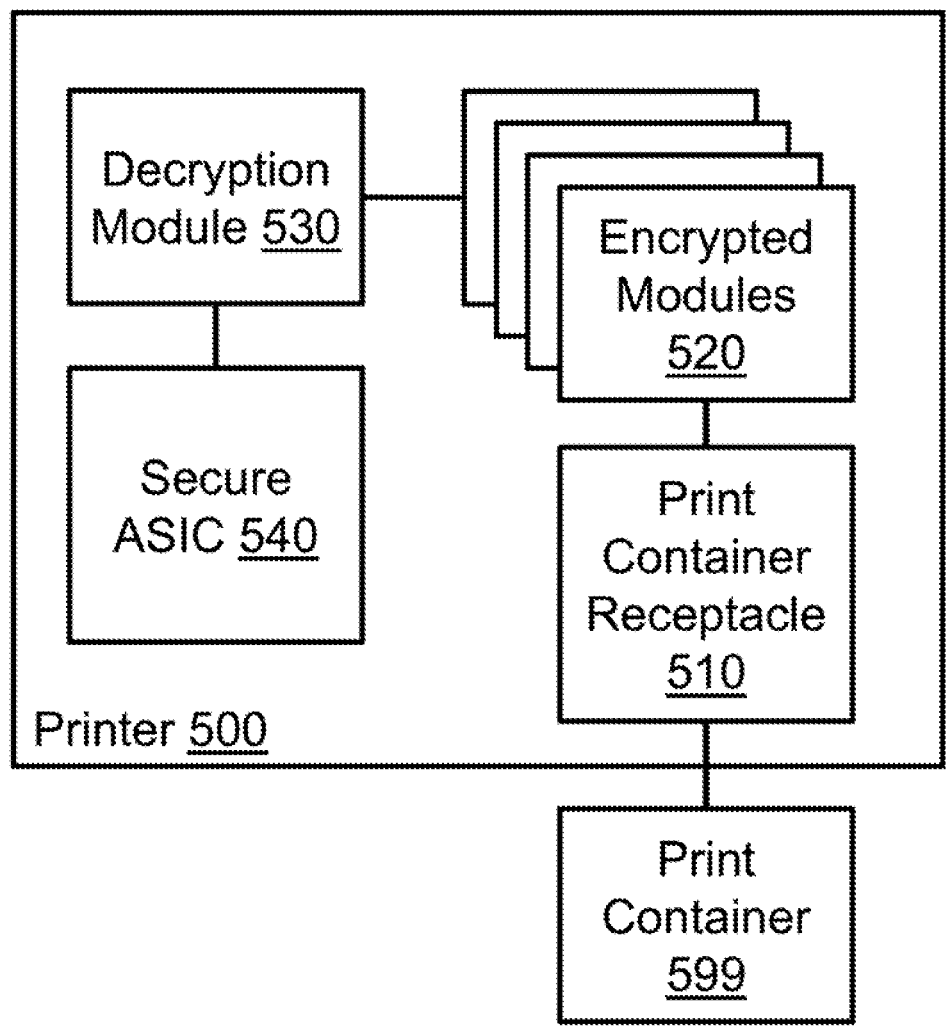
FIG. 5 illustrates another example printer associated with printer firmware encryption.

FIG. 5 illustrates a printer 500 associated with printer firmware encryption. Printer 500 may be a variety of types of printers that uses a variety of techniques for printing documents, photographs, posters, and so forth. Printer 500 includes a print container receptacle 510. Print container receptacle may receive print containers 599 that provide print materials to printer 500. Print container 599 may deliver a supply of print material to the printer. The print material may be, for example, ink, toner, a 3D print material, and so forth depending on what output printer 500 is designed to produce.

Printer 500 also includes a series of encrypted modules 520. Encrypted modules 520 may be associated with a set schedule over which encrypted modules 520 are to be decrypted. Encrypted modules 520 may authenticate print containers 599. Consequently, encrypted modules 520 may prevent usage by printer 500 of print containers 599 that fail authentication. Encrypted modules 520 may be inactive until decrypted. Keeping encrypted modules 520 in an inactive state may make it challenging to uncover their purpose prior to their decryption. This may hinder producing a counterfeit or otherwise unauthorized print container prior to the activation of a corresponding encrypted module.

Printer 500 also includes a decryption module 530. Decryption module 530 may receive decryption keys associated with encrypted modules 520. Decryption module 530 may also decrypt encrypted modules 520 using respective decryption keys. Decryption module 530 may also control execution of encrypted modules 520 after decrypting encrypted modules 520.

Printer 500 also includes a secure application specific integrated circuit (ASIC) 540. Secure ASIC 540 may store the decryption keys. Additionally, secure ASIC 540 may release the decryption keys to decryption module 530 upon occurrence of predefined events associated with the set schedule.

Figure 6:
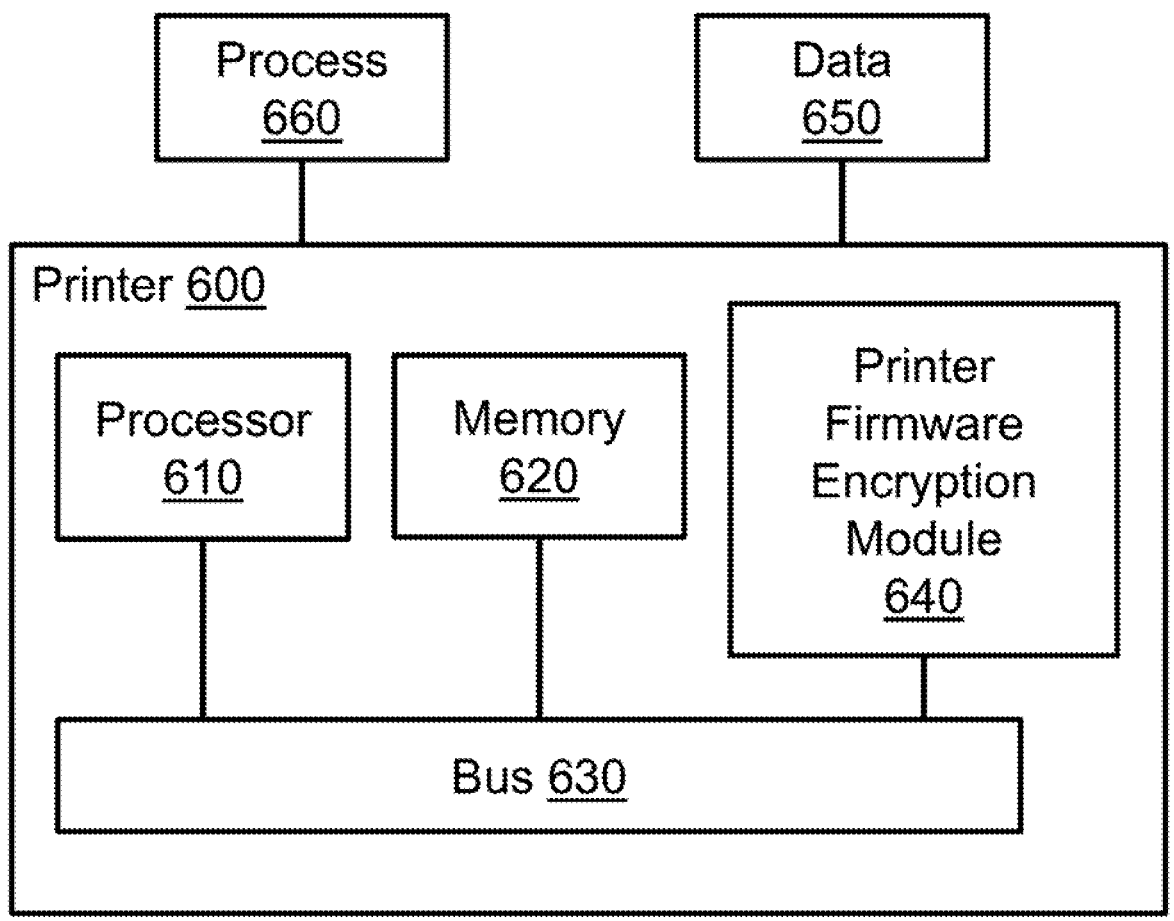
FIG. 6 illustrates an example printer in which example systems, and methods, and equivalents, may operate.

FIG. 6 illustrates an example printer in which example systems and methods, and equivalents, may operate. The example printer may be a printer 600 that includes a processor 610 and a memory 620 connected by a bus 630. Printer 600 includes a printer firmware encryption module 640. Printer firmware encryption module 640 may perform, alone or in combination, various functions described above with reference to the example devices, methods, and so forth. In different examples, printer firmware encryption module 640 may be implemented as a non-transitory computer-readable medium storing processor-executable instructions.

The instructions may also be presented to device 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Device 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A printer comprising:
   a memory storing a firmware comprising a set of instructions to control and monitor the printer, including an active base firmware function of the printer and a first firmware function of the printer that is inactive, a first portion of the memory corresponding to the first firmware function and that is encrypted; and
   a processor to execute the instructions to:
      control and monitor the printer according to the active base firmware function;
      decrypt the first portion of the memory corresponding to the first firmware function, upon receiving a first encryption key, activating the first firmware function; and
      control and monitor the printer according to the first firmware function upon decryption of the first portion of the memory corresponding to the first firmware function, the first firmware function becoming active upon decryption of the first portion of the memory,
   wherein encryption of the first portion of memory permits delayed activation of the first firmware function via the first encryption key.

2. The printer of claim 1, comprising a secure application specific integrated circuit to provide, at a predetermined occasion, the first encryption key to the processor.

3. The printer of claim 1, wherein the firmware includes a second firmware function of the printer that is inactive, a second portion of the memory corresponding to the second firmware function and that is encrypted,
   and wherein the processor is to execute the instructions to further:
      decrypt the second portion of the memory corresponding to the second firmware function upon receiving a second encryption key; and
      control and monitor the printer according to the second firmware function upon decryption of the second portion of the memory corresponding to the second firmware function, the second firmware function becoming active upon decryption of the second portion of the memory.

4. The printer of claim 1, where the first function relates to one of a reward function associated with the printer, a security function of the printer, a schedule on which other inactive functions are activated to compensate for aging of a component of the printer and provide counterfeit deterrence by the printer.

5. The printer of claim 1, where the base firmware function and the first firmware instruction control how the printer authenticates authorized containers of print material inserted into the printer.

6. The printer of claim 5, where an authorized container of print material is one of a print container that has been designed and manufactured for the printer and is not a counterfeit print container.

7. The printer of claim 5, where, upon activation, the first firmware function deactivates operation of the base firmware function.

8. The printer of claim 1, where the processor receives the first encryption key from one of, another component of the device, an external device over a network connection, an external device over a direct connection, and a user input.

9. A method, comprising:
   embedding, in a memory of a printer, firmware comprising a set of instructions to control and monitor the printer, including:
      a series of firmware functions that are inactive and that have corresponding portions of the memory that are encrypted, the corresponding portions of the memory to be decrypted on a set schedule to activate the firmware functions in a delayed manner; and
      instructions to receive decryption keys associated with the encrypted portions of the memory, to decrypt the encrypted portions of the memory using respective decryption keys to activate respective firmware functions, and to control and monitor the printer according to the firmware functions upon activation; and
   controlling delivery of the decryption keys to the printer.

10. The method of claim 9, wherein controlling delivery of the decryption keys comprises embedding a secure application specific integrated circuit (ASIC) within the printer where the secure ASIC provides the decryption keys in association with the set schedule.

11. The method of claim 9, wherein the series of firmware functions that are encrypted are embedded in memory of each of a plurality of printers, and the decryption keys vary among members of the set of printers.

12. The method of claim 9, where the firmware functions affect how the printer authenticates as authentic, containers of print material that are released over the life cycle of the printer.

13. A printer, comprising:
   a memory storing a firmware comprising a set of instructions to control and monitor the printer, including a series of firmware functions that are inactive and that have corresponding portions of the memory that are encrypted, the corresponding portions of the memory to be decrypted on a set schedule to activate the firmware functions in a delayed manner, where the firmware functions authenticate containers of the print material;

a processor to execute the instructions to to receive decryption keys associated with the portions of the memory that are encrypted, to decrypt the portions of the memory using respective decryption keys to activate respective firmware functions, and to control and monitor the printer according to the activated firmware functions; and a secure application specific integrated circuit to store the decryption keys and to release the decryption keys to the processor according to the set schedule.

14. The printer of claim 13, where a firmware function of the series of firmware functions prevents usage, by the printer, of a container of print material when the container of print material fails authentication by the encrypted module.

* * * * *